United States Patent [19]

Thomas et al.

[11] Patent Number: 4,829,642
[45] Date of Patent: May 16, 1989

[54] METHOD OF MAKING A CRANKSHAFT

[75] Inventors: James A. Thomas, Defiance, Ohio; David A. Coan, Menasha, Wis.

[73] Assignee: General Motors Corporation, Detroit, Mich.

[21] Appl. No.: 222,854

[22] Filed: Jul. 22, 1988

[51] Int. Cl.⁴ .............................................. B21K 1/08
[52] U.S. Cl. ..................... 29/6; 29/156.4 R; 29/527.6; 164/98; 164/100
[58] Field of Search .................. 29/6, 156.4 R, 413, 29/414, 527.6; 164/98, 100, 101, 102, 103; 74/596, 595, 597

[56] References Cited

U.S. PATENT DOCUMENTS

| | | | |
|---|---|---|---|
| 1,630,138 | 5/1927 | Schutz. | |
| 2,917,946 | 12/1959 | Fritz | 74/596 |
| 3,064,112 | 11/1962 | Hanzel | 219/44 |
| 3,853,309 | 12/1974 | Widmer | 266/41 |
| 3,965,962 | 6/1976 | Tanaka et al. | 164/55 |
| 4,285,385 | 8/1981 | Hayashi et al. | 164/98 |
| 4,344,477 | 8/1982 | Miki et al. | 164/98 |
| 4,534,241 | 8/1985 | Remmerfelt et al. | 29/6 |
| 4,580,430 | 4/1986 | Takeda et al. | 29/6 |
| 4,620,507 | 11/1986 | Saito et al. | 164/98 |
| 4,749,624 | 6/1988 | Pete et al. | 428/586 |

FOREIGN PATENT DOCUMENTS

| | | | |
|---|---|---|---|
| 5578813 | 12/1978 | Japan | 164/98 |
| 0158869 | 12/1980 | Japan | 164/98 |
| 2024066 | 1/1980 | United Kingdom | 164/98 |

OTHER PUBLICATIONS

"Bending Fatigue Strength of Nodular Graphite Cast Iron Crankshafts", Wright & Willis, Mar. 1962.

Primary Examiner—Howard N. Goldberg
Assistant Examiner—Irene Cuda
Attorney, Agent, or Firm—Douglas D. Fekete

[57] ABSTRACT

A method of making a crankshaft involves positioning a serpentine-shaped tube in a casting mold with a plurality of removable (breakaway) portions of the tube spaced apart along the length thereof supported in the mold body and a plurality of oil line-forming portions of the tube between the removable portions bridging across a crankshaft-shaped mold cavity formed in the mold. Molten metal is cast into the mold cavity about the oil line-forming portions of the tube to form a cast crankshaft with the oil line-forming portions of the tube cast in-situ therein and the removable portions of the tube disposed externally of the cast crankshaft. After separating the cast crankshaft and the mold, the removable portions of the tube are severed from the cast crankshaft, preferably broken off from the cast crankshaft at scored locations on the serpentine-shaped tube, to leave a plurality of open-ended, tubular oil lines cast in-situ in the crankshaft.

15 Claims, 3 Drawing Sheets

METHOD OF MAKING A CRANKSHAFT

FIELD OF THE INVENTION

The invention relates to a method of making an article having a plurality of open-ended, internal, tubular conduits and, in particular, to a method of making a crankshaft having a plurality of open-ended, tubular oil lines cast in-situ therein.

BACKGROUND OF THE INVENTION

In the past, various techniques have been employed to manufacture crankshafts for internal combustion engines wherein the crankshaft includes a plurality of open-ended, internal oil passages for supplying lubrication to the main engine bearing journals and the connecting rod bearing journals. One typical approach involves casting the crankshaft in a suitable mold and then drilling the lubrication passages in the cast crankshaft. Lubrication passages formed by drilling are limited to linear passages. Moreover, drilling of the lubrication passages produces metal chips and other debris that must be removed from the lubrication passages.

It has been proposed to cast a crankshaft having a plurality of individual metal tubes cast in-situ therein to form respective individual tubular oil lines in the crankshaft. In this manufacturing approach, the individual metal tubes are manually positioned and aligned in the mold cavity and held in aligned position by a plurality of chaplets or other similar mechanical positioning devices as metal is cast in the mold cavity. As a result, this manufacturing approach is labor intensive, time consuming, and therefore costly as well as prone to error in the positioning and aligning of the individual metal tubes in the mold cavity.

SUMMARY OF THE INVENTION

The invention contemplates a method of making an article, especially a crankshaft, comprising positioning a single, serpentine-shaped tube in a casting mold in such a way that a plurality of removable portions of the tube spaced apart along the length thereof are disposed in the mold and a plurality of conduit-forming portions of the tube between the removable portions bridge across a suitably shaped mold cavity formed in the mold, casting molten metal in the mold cavity about the conduit-forming portions to form a cast crankshaft having the conduit forming portions of the tube cast in-situ therein and the removable portions of the same tube disposed externally of the cast crankshaft, separating the mold and cast crankshaft, and removing the removable portions of the tube from the cast crankshaft to leave a plurality of open-ended, tubular conduits (e.g., oil lines) cast in-situ therein.

A preferred embodiment of the invention involves scoring or grooving the serpentine-shaped tube at predetermined locations to form a plurality of removable, braakaway portions on the tube and a plurality of oil line-forming portions therebetween. The scored tube is positioned in the mold and molten metal is cast therein about the oil line-forming portions thereof in the manner described hereinabove. After the mold and the cast crankshaft are separated following casting, the removable, breakaway portions of the tube are exposed externally of the cast crankshaft and are removed from the cast crankshaft by simply breaking them off the cast crankshaft at the scored locations adjacent the exterior surfaces formed on the cast crankshaft.

The method of the invention permits the casting of articles, especially crankshafts, having a plurality of complex-shaped, open-ended, tubular conduits cast in-situ therein which are not limited to straight or drafted configurations and which are not otherwise possible and/or economical to produce by other methods. Fewer component parts as well as less labor intensive operations are involved in practicing the method of the invention compared to other methods used in the art to make such articles. Moreover, the incidence of casting defects in the cast crankshaft is significantly reduced while the structural integrity and cleanliness of the cast in-situ tubular conduits is improved by the method of the invention.

The invention may be better understood when considered in the light of the following detailed description of certain specific embodiments thereof which is given hereafter in conjunction with the following drawings.

BEST MODE OF PRACTICING THE INVENTION

Figure 1:
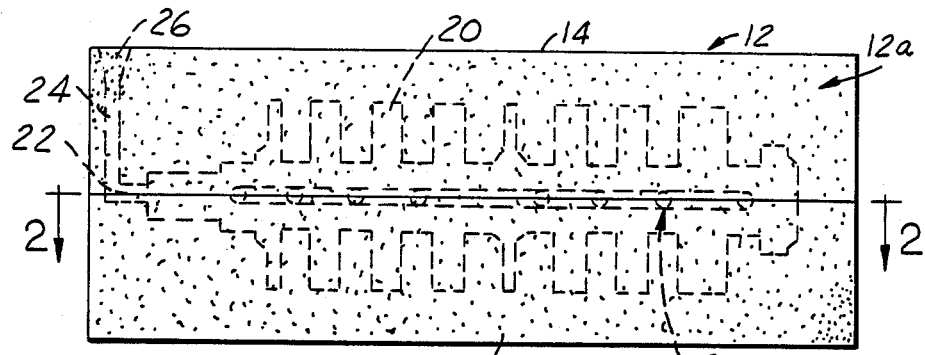
FIG. 1 is a side elevational view of a green sand casting mold having the serpentine-shaped tube positioned therein.
Figure 2:
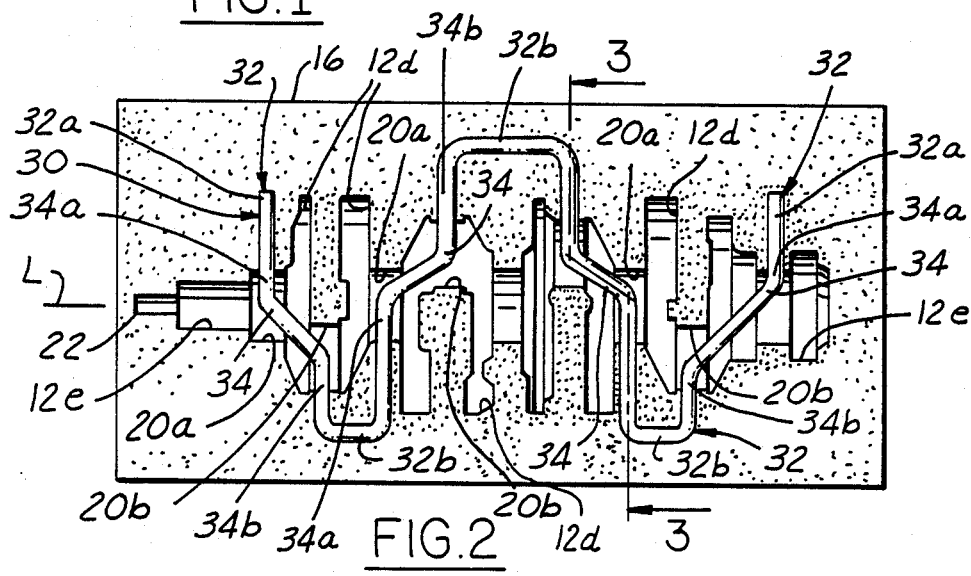
FIG. 2 is a plan view of the bottom half of a green sand casting mold showing the serpentine-shaped tube positioned therein.
Figure 3:
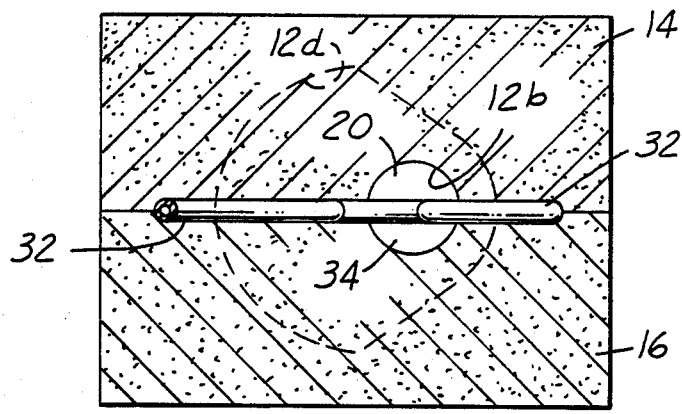
FIG. 3 is a cross-sectional view taken along lines 3—3 of FIG. 2.
Figure 5:
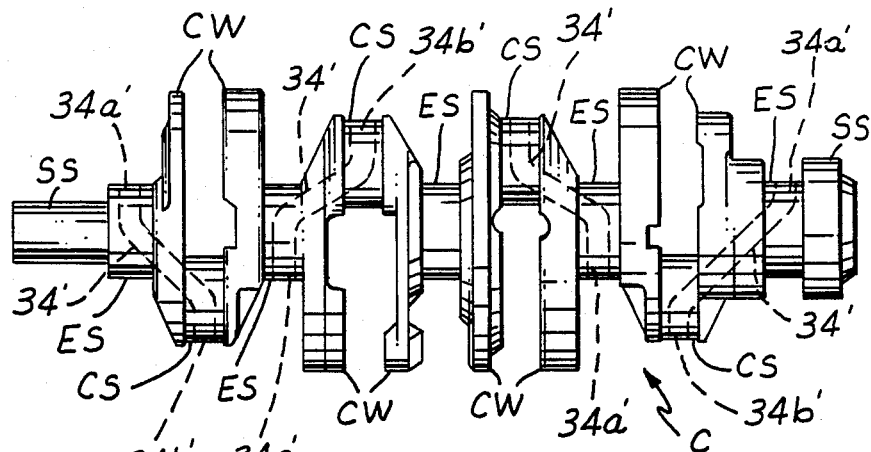
FIG. 5 is an elevational view of the cast crankshaft after removal of the removable portions of the serpentine-shaped tube.

Referring to FIGS. 1 through 3, a casting apparatus for practicing the method of the invention is shown as including a green sand casting mold 12 having a mold body 12a comprising an upper mold portion 14 (cope) and a lower mold portion 16 (drag) joined together. The upper mold portion 14 and the lower mold portion 16 are configured to define therebetween a mold cavity 20 having the shape of the crankshaft C to be cast, FIG. 5, and having a longitudinal axis L corresponding to that of the crankshaft to be cast.

The mold cavity 20 includes longitudinally spaced apart, cylindrical mold surfaces or walls 20a for forming the cylindrical main engine bearing surfaces ES on the cast crankshaft C and other longitudinally spaced apart, cylindrical mold surfaces 20b for forming the cylindrical connecting rod bearing surfaces CS on the cast crankshaft C when molten metal is cast in the mold cavity 20. Of course, the mold cavity 20 includes other mold surfaces to form the remaining features of the cast crankshaft, e.g., counterweight-forming surfaces 12d for forming counterweights CW on the cast crankshaft, shaft forming surfaces 12e for forming end shafts SS on the cast crankshaft as well as other required crankshaft features.

The mold cavity 20 communicates with a horizontal runner 22, a vertical sprue 24 and a pouring basin 26 formed in the casting mold 12.

Positioned in the casting mold 12 between the upper and lower mold portions 14,16 is a single, elongate, serpentine-shaped metal (e.g., steel) tube 30. The metal tube 30 is prebent or otherwise formed into the serpentine shape shown prior to positioning in the mold 12. Conventional tube bending procedures may be employed to impart the desired bend to the tube 30.

The serpentine-shaped tube 30 includes a plurality of removable portions 32 spaced apart along its length and a plurality of oil line-forming portions 34 (conduit-forming portions) disposed between the removable portions 32.

The prebent, serpentine-shaped tube 30 is positioned in the mold 12 much that the removable portions 32 (which include straight end portions 32a and U-shaped portions 32b) are supported or embedded in the mold body 12a and the oil line-forming portions 34 bridge across the mold cavity 20 transverse to its longitudinal axis L. The oil line-forming portions 34 are thereby suspended in the mold cavity 20 by the removable portions 32 that are supported in the mold body 12a.

Each oil line-forming portion 34 includes an end-forming portion 34a that is positioned adjacent a respective cylindrical mold surface 20a (that will form a respective main engine bearing surfaces ES) and another end-forming portion 34b that is positioned adjacent a respective cylindrical mold surface 20b (that will form a respective connecting rod bearing surface CS) on the cast crankshaft C. As will be explained hereinbelow, the end-forming portions 34a,34b of each oil line-forming portion will form open ends 34a',34b' of the cast in-situ tubular oil lines 34', FIG. 5, when the removable portions 32 of the tube 30 are severed from the cast crankshaft C.

The crankshaft C is formed by casting molten metal (e.g., nodular iron) into the mold cavity 20 about the oil line-forming portions 34 that bridge transversely across the mold cavity 20. As is known, the molten metal is poured in the basin 26 and flows through sprue 24 and runner 22 into the mold cavity 20 to fill same.

Figure 4:
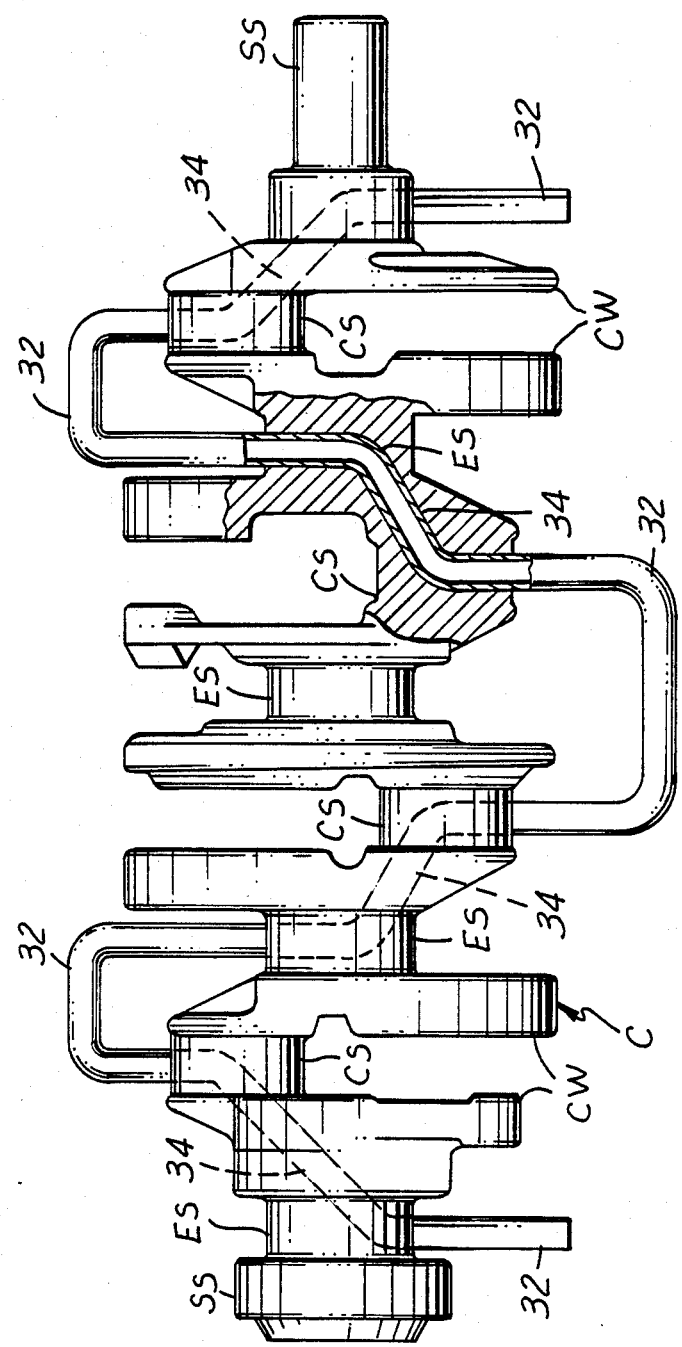
FIG. 4 is a partially sectioned, elevational view of a cast crankshaft with the oil line-forming portions of the serpentine-shaped tube cast in-situ therein and the removable portions of the serpentine-shaped tube exposed externally of the cast crankshaft.

Once the molten metal has solidified, the upper and lower mold portions 14,16 are separated and the cast crankshaft C is removed from the mold 12. As shown best in FIG. 4, the cast crankshaft C includes the oil line-forming portions 34 cast in-situ therein and the removable portions 32 exposed externally of the cast crankshaft. The oil line-forming portions 34 (made of steel) are metallurgically bonded to the cast crankshaft during the casting and solidification step.

Following separation of the cast crankshaft C from the mold 12, the removable portions 32 are removed from the cast crankshaft C to leave a plurality of open-ended tubular oil lines or conduits 34' cast in-situ therein. Each tubular oil line 34' includes an open end 34a' disposed adjacent a respective main engine bearing surface ES and another longitudinally displaced open end 34b' adjacent a respective connecting rod bearing surface CS on the cast crankshaft C. The removable portions 34 can be removed from the cast crankshaft C by various means such as cutting, sawing and the like.

Figure 6:
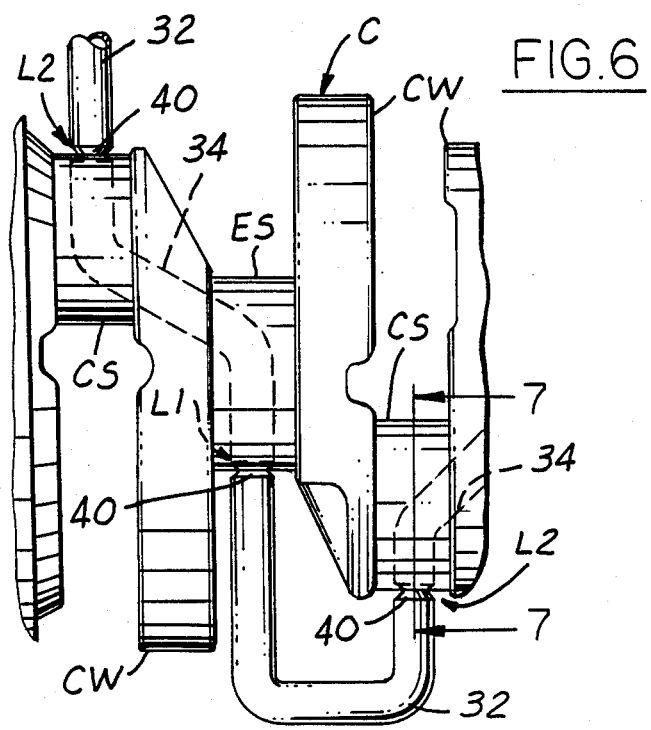
FIG. 6 is an enlarged, fragmentary elevational view of a crankshaft formed in accordance with another embodiment of the method of the invention.
Figure 7:
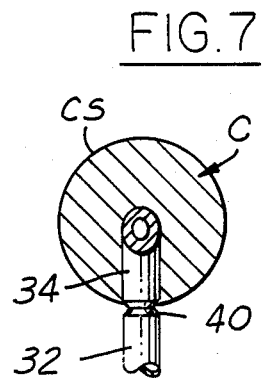
FIG. 7 is a cross-sectional view taken along lines 7—7 of FIG. 6 showing the configuration of the breakaway grooves formed in the serpentine tube.

A preferred technique for removing the removable portions 32 from the cast crankshaft C is illustrated in FIGS. 6 and 7 where like reference numerals represent like features of the preceding Figures. This technique involves initially cutting, machining or otherwise scoring the perimeter of the serpentine-shaped tube 30 at predetermined longitudinal locations to provide V-shaped, peripheral grooves or notches 40 in the tube (grooves 40 shown exaggerated in size in FIGS. 6 and 7 for clarity). The grooves 40, in effect, form a plurality of removable, breakaway portions 32 along the length of the tub 30. The V-shaped grooves or notches 40 are cut at predetermined longitudinal locations L1,L2 along the tube length adjacent to the intended bearing surfaces ES,CS, respectively, to be formed on the cast crankshaft C (i.e., formed by casting metal against mold surfaces 20a,20b). The scored, serpentine-shaped tube 30 is then positioned in the casting mold 12 and molten metal is cast therein about oil line-forming portions 34 of the tube 30 as described hereinabove for FIGS. 1 through 5. After removal of the cast crankshaft C from the casting mold, the removable, breakaway portions 32 (formed between the grooves 40 of the tube) are removed from the crankshaft by breaking the removable portions 32 off at the grooves 40 adjacent the respective cast bearing surfaces ES,CS on the crankshaft C. Using the V-shaped grooves 40 shown, the removable, breakaway portions 32 will break off cleanly adjacent the cast bearing surfaces ES,CS. The removable portions 32 can be broken off adjacent the cast bearing surfaces ES,CS either externally or flush therewith depending on the location of the grooves 40 along the length of the tube 30. Preferably, the removable portions 32 are broken off adjacent and at most slightly exterior of the cast bearing surfaces ES,CS such that there is no more than a slight protuberance of flash of metal that is left on the oil-line forming portions 34 and that is readily removed from the oil-line forming portions 34 by subsequent machining of the cast bearing surfaces ES,CS as explained herebelow. This embodiment of the invention is advantageous from the standpoint that there is no need to cut or saw the serpentine-shaped tube 30 to sever the removable portions 32 from the cast crankshaft C.

After the removable portions 32 are removed from the cast crankshaft C, the cast bearing surfaces ES,CS are then machined to the desired final diameter and surface finish.

Those skilled in the art will appreciate that the method of the invention using the prebent, serpentine-shaped tube 30 positioned in the casting mold 12 as described hereinabove provides a less costly, less labor intensive technique for forming a plurality of complex-shaped, open-ended, tubular oil lines or conduits int he cast crankshaft C (or other article) and permits the formation of internal oil lines or conduits having configurations not possible and/or economical to form in an article using other available casting methods. Furthermore, disruptions of the microstructure of the metal (e.g., nodular iron) cast around the conduit-forming portions 34 and the presence of defects, such as porosity, sand holes, fins and burn-in, are minimized or eliminated with the method of the invention. The cleanliness and structural integrity of the tubular oil lines 34' provided in the cast crankshaft is significantly improved by the method of the invention as those skilled in the art will appreciate.

Although the method of the invention has been described hereinabove in connection with a green sand casting mold, those skilled in the art will understand that the invention is not so limited and that the invention may be practiced using other casting molds and processes. Moreover, the invention may be practiced with one or more destructible patterns positioned in a casting mold to form a desired shape of mold cavity in the mold. The destructible pattern can be designed to accommodate the serpentine-shaped tube 30 such that the oil line-forming portions thereof bridge across the mold cavity formed by the destructible pattern in the mold.

Furthermore, while the invention has been described in terms of specific preferred embodiments thereof, it is not intended to be limited thereto but rather only to the extent set forth hereafter in the following claims.

The embodiments of the invention in which an exclusive property or privilege is claimed are defined as follows:

1. A method of making a crankshaft, comprising:
   (a) providing a mold having a mold body and a mold cavity formed in the mold body and configured in the shape of the crankshaft to be cast,
   (b) positioning an elongate, serpentine-shaped tube in the mold with a plurality of removable portions of the tube spaced apart along the length thereof being disposed in the mold body and a plurality of oil line-forming portions of said tube between said removable portions bridging across the mold cavity,
   (c) casting molten metal in the mold cavity about said oil line-forming portions to form a cast crankshaft with said oil line-forming portions cast in-situ in the cast crankshaft and said removable portions disposed externally of the cast crankshaft,
   (d) separating the cast crankshaft and the mold, and
   (e) removing said removable portions of said tube from the cast crankshaft, leaving said oil line-forming portions in said cast crankshaft to provide a plurality of open-ended, tubular oil lines cast in-situ therein.

2. The method of claim 1 wherein the mold cavity includes a longitudinal axis corresponding to the longitudinal axis of the crankshaft to be cast, said tube being positioned in the mold such that said oil line-forming portions bridge across said mold cavity transverse to the longitudinal axis of the mold cavity.

3. The method of claim 1 wherein said removable portions of said tube are removed from the cast crankshaft by severing said removable portions therefrom.

4. The method of claim 1 wherein said removable portions of the tube are formed thereon by scoring the tube at predetermined locations along its length prior to positioning the tube in the mold.

5. The method of claim 4 including scoring said tube at locations along its length that will be adjacent exterior surfaces formed on the cast crankshaft.

6. The method of claim 5 wherein said removable portions are broken off the cast crankshaft at the locations where the tube is scored.

7. The method of claim 1 wherein the removable portions of the tube are supported in the mold.

8. A method of making a crankshaft, comprising:
   (a) providing a mold having a mold body and a mold cavity formed in the mold body and configured in the shape of the crankshaft to be cast,
   (b) scoring an elongate tube about its perimeter at predetermined locations along the length of the tube to form removable, breakaway portions spaced apart along the length of the tube and an oil line-forming portion between the removable, breakaway portions,
   (c) positioning the tube in the mold with said removable portions disposed in the mold body and said oil line-forming portion bridging across the mold cavity,
   (d) casting molten metal in the mold cavity about said oil line-forming portion to form a cast crankshaft with said oil line-forming portion cast in-situ therein and said removable portions disposed externally of the cast crankshaft,
   (e) separating the cast crankshaft and the mold, and
   (f) removing said removable portions from the cast crankshaft by breaking said removable portions off the cast crankshaft at the scored locations, leaving said oil line-forming portion in said cast crankshaft to provide an open-ended, tubular oil line cast in-situ therein.

9. The method of claim 8 wherein in step (b) the tube is scored about its perimeter at locations that will be adjacent exterior bearing surfaces formed on the cast crankshaft.

10. The method of claim 9 wherein in step (f) said removable portions are broken off adjacent the exterior bearing surfaces formed on the cast crankshaft.

11. The method of claim 8 wherein in step (a) the tube is scored by forming a groove therein at said locations.

12. A method of making an article comprising:
    (a) providing a mold having a mold body and a mold cavity formed in the mold body and configured in the shape of the article to be cast,
    (b) positioning an elongate, serpentine-shaped tube in the mold with a plurality of removable portions of the tube spaced apart along the length thereof being disposed in the mold body and a plurality of conduit-forming portions of said tube between said removable portions bridging across the mold cavity,
    (c) casting molten metal in the mold cavity about said conduit-forming portions to form a cast article with the conduit-forming portions cast in-situ therein and said removable portions disposed externally of the cast article,
    (d) separating the cast article and the mold,
    (e) removing said removable portions of said tube from the cast article, leaving said conduit-forming portions in said cast article to provide a plurality of open-ended, tubular conduits cast in-situ therein.

13. The method of claim 12 wherein said removable portions of said tube are formed thereon by scoring the tube at predetermined locations along its length prior to positioning in the mold.

14. The method of claim 13 including scoring the tube at locations along its length that will be adjacent exterior surfaces formed on the cast article.

15. The method of claim 14 wherein said removable portions are removed by breaking them off the cast article at the locations where the tube is scored.

* * * * *